(12) United States Patent
Cho et al.

(10) Patent No.: US 12,249,015 B2
(45) Date of Patent: Mar. 11, 2025

(54) JOINT ROTATION INFERENCES BASED ON INVERSE KINEMATICS

(71) Applicant: Hinge Health, Inc., San Francisco, CA (US)

(72) Inventors: Dongwook Cho, Pierrfonds (CA); Colin Joseph Brown, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 196 days.

(21) Appl. No.: 17/906,855

(22) PCT Filed: Mar. 20, 2020

(86) PCT No.: PCT/IB2020/052601
§ 371 (c)(1),
(2) Date: Sep. 20, 2022

(87) PCT Pub. No.: WO2021/186223
PCT Pub. Date: Sep. 23, 2021

(65) Prior Publication Data
US 2023/0154091 A1    May 18, 2023

(51) Int. Cl.
*G06T 13/40* (2011.01)
*G06N 3/08* (2023.01)
*G06T 7/70* (2017.01)

(52) U.S. Cl.
CPC ............... *G06T 13/40* (2013.01); *G06N 3/08* (2013.01); *G06T 7/70* (2017.01);
(Continued)

(58) Field of Classification Search
CPC . G06T 13/40; G06T 7/70; G06T 2207/20084; G06T 2207/20081
(Continued)

(56) References Cited

U.S. PATENT DOCUMENTS 5,371,834 A    12/1994  Tawel
10,388,053 B1 *  8/2019  Carter, Jr. ............... G06T 13/80
(Continued)

FOREIGN PATENT DOCUMENTS

JP    2014522035 A    8/2014
JP    2018520444 A    7/2018
(Continued)

OTHER PUBLICATIONS

"Style-based inverse kinematics" Keith Grochow et al., ACM SIGGRAPH 2004, pp. 522-531.*
(Continued)

*Primary Examiner* — Javid A Amini
(74) *Attorney, Agent, or Firm* — Perkins Coie LLP

(57) ABSTRACT

An example of an apparatus to infer joint rotations and positions is provided. The apparatus includes a communications interface to receive raw data from an external source. The raw data includes a first joint position and a second joint position of an input skeleton. In addition, the apparatus includes a memory storage unit to store the raw data. Furthermore, the apparatus includes a pre-processing engine to generate normalized data from the raw data. The normalized data is to be stored in the memory storage unit. Also, the apparatus includes an inverse kinematics engine to apply a neural network to infer a joint rotation from the normalized data. The neural network is to use historical data. Training data used to train the neural network includes positional noise.

14 Claims, 5 Drawing Sheets

(52) U.S. Cl.
CPC ............... *G06T 2207/20081* (2013.01); *G06T 2207/20084* (2013.01); *G06T 2207/30196* (2013.01)

(58) Field of Classification Search
USPC ......................................................... 345/419
See application file for complete search history.

(56) References Cited

U.S. PATENT DOCUMENTS

| | | | |
|---|---|---|---|
| 2010/0208038 A1 | 8/2010 | Kutliroff et al. | |
| 2013/0028517 A1* | 1/2013 | Yoo | G06V 40/107 382/173 |
| 2016/0267699 A1* | 9/2016 | Borke | G06F 3/017 |
| 2018/0020978 A1* | 1/2018 | Kaifosh | G06F 3/017 702/150 |
| 2021/0390355 A1* | 12/2021 | Xu | G06F 18/214 |
| 2023/0042756 A1* | 2/2023 | Song | B25J 9/161 |

FOREIGN PATENT DOCUMENTS

| | | | |
|---|---|---|---|
| JP | 2019040421 A | 3/2019 | |
| WO | 2013015528 A1 | 1/2013 | |

OTHER PUBLICATIONS

"Recurrent neural network", Wikipedia, the free encyclopedia, online document, accessed Nov. 11, 2021 via: https://web.archive.org/web/20190711195429/https://en.wikipedia.org/wiki/Recurrent_neural_network, XP055856722, Jul. 11, 2019, 18 pages.

Kenwright, Ben, "Neural Network in Combination with a Differential Evolutionary Training Algorithm for Addressing Ambiguous Articulated Inverse Kinematic Problems", Proceedings of the 35th IEEE/ACM International Conference on Automated Software Engineering, ACMPUB27, New York, NY,, Dec. 4, 2018, pp. 1-4.

Yenamandra, Tarun, et al., "Convex Optimisation for Inverse Kinematics", 2019 International Conference on 3D Vision (3DV), IEEE, XP033653349, Sep. 16, 2019, pp. 318-327.

Ito, Masato, et al., "On-line imitative interaction with a humanoid robot using a mirror neuron model", IEEE International Conference on Robotics and Automation, Apr. 26, 2004, pp. 1071-1076.

Mizuno, Katsuya, et al., "A System for Estimating Human Movement for Supporting 3D Character Animation Creation", Information Processing Society of Japan, Research Report vol. 2008, No. 80, Aug. 15, 2008.

Grochow et al., "Style-Based Inverse Kinematics," [retrieved on Oct. 22, 2020 from: <https://dl.acm.org/doi/pdf/10.I 145/1186562.1015755>; SIGGRAPH 2004, pp. 522-531, Aug. 2004.

"Recurrent neural network," from Wikipedia, the free encyclopedia, retrieved on Oct. 23, 2020 from Internet Archive: <https:/ /web.archive.org/web/20190711195429/https://en.wikipedia.org/wiki/Recurrent_ neural_ network>; 24 pages, Jul. 2019.

Kanazawa et al., "End-to-end Recovery of Human Shape and Pose," Proceedings of 2018 IEEE/CVF Conference on Computer Vision and Pattern Recognition (CVPR), retrieved on Oct. 27, 2020 from: <https:/ /ieeexplore.ieee.org/stamp/stamp.j sp?tp=&arnumber=8578842>] *entire document, esp. sections 1 and 3*; pp. 7122-7131, Jun. 19-21, 2018.

* cited by examiner

JOINT ROTATION INFERENCES BASED ON INVERSE KINEMATICS

CROSS-REFERENCE TO RELATED APPLICATION

This application is a national stage entry of International Patent Application No. PCT/IB2020/052601, filed on Mar. 20, 2020, and titled "JOINT ROTATION INFERENCES BASED ON INVERSE KINEMATICS," which is incorporated by reference herein in its entirety.

BACKGROUND

Computer animation may be used in in various applications such as computer-generated imagery in the film, video games, entertainment, biomechanics, training videos, sports simulators, and other arts. In order to provide for smooth and natural animation, the relative motion of parts of the subject is to be modelled. For example, in a human subject, a joint of a representative skeleton may represent a physical bone joint. It is to be appreciated that a human bone joint typically has a limited range of motion. As a specific example, some human joints, such as a knee or elbow, are capable of pivoting in a single plane while other joints, such as a shoulder, may pivot in three dimensions.

BRIEF DESCRIPTION OF THE DRAWINGS

Reference will now be made, by way of example only, to the accompanying drawings in which.

DETAILED DESCRIPTION

Computer animation is used in a broad range of different sectors to provide motion to various objects, such as people. The movement of people is complicated to model and replicate as the human body includes many joints with various ranges of motion. Although a movement such as raising a hand on of a person may seem simple, such a motion involves at least a shoulder and an elbow each rotating in a specific manner. Accordingly, the animation of such a movement may involve several rotations of different joints and that incorrect motions at any joint may result in an animated movement that appears unnatural. Therefore, the range of movement for each joint is to be determined such that more natural and realistic movements may be generated using various computer animation techniques.

Calculating the movement of a portion of a subject, such as a hand, when joint parameters, such as the range of motion, for each joint involved in the motion may be carried out via various calculations. The reverse operation, such as determining the joint movements to provide a specific hand movement when the joint parameters are not known may be carried out using inverse kinematics techniques. Determining the motion of a subject using inverse kinematics may be particularly useful to infer a naturally appearing motion of a portion of a subject, such as a hand of a person. However, because the motion may involve multiple joint rotations that may involve an under-constrained mathematical problem with limited input other than the tracking of a hand. This may result in an mathematically impossible problem to solve using traditional techniques.

An apparatus and method of computing inverse kinematics using machine learning is provided. The apparatus may receive a human skeleton representation, such as a three-dimensional skeleton, having a plurality of joints. The source of the human skeleton is not particularly limited an may be provided as an input dataset in some examples. In other examples, the skeleton may be derived from an image or video captured by a camera using a pose estimation engine. The apparatus may subsequently infer rotations and positions for each joint in the skeleton. The inferred rotations and positions may then be used to facilitate the pose or animation of the skeleton to appear natural.

In the present description, the models and techniques discussed below discussed are generally applied to a human subject. It is to be appreciated by a person of skill with the benefit of this description that the examples described below may be applied to other subjects as well such as animals and machines.

Figure 1:
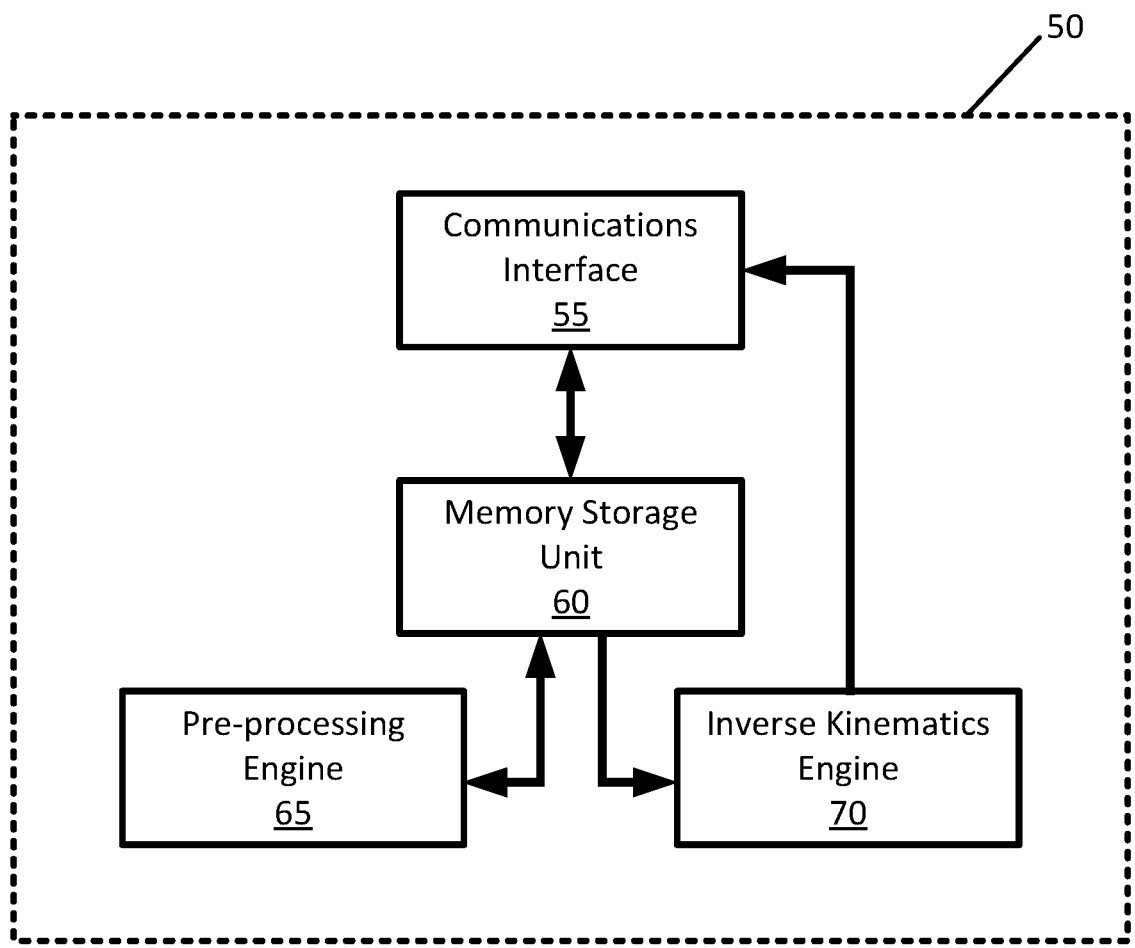
FIG. 1 is a schematic representation of the components of an example apparatus to infer a joint rotation.

Referring to FIG. 1, a schematic representation of an apparatus to infer joint rotations and positions is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus operates, updating parameters of the apparatus 50, or resetting the apparatus 50. In the present example, the apparatus 50 is to receive skeleton data and to process the skeleton data to generate a plurality of inferred rotations at joints in the skeleton as well as any adjustments to the position of the joint. In the present example, the apparatus 50 includes a communications interface 55, a memory storage unit 60, a pre-processing engine 65, and an inverse kinematics engine 70.

The communications interface 55 is to communicate with an external source to receive raw data representing an input skeleton. In the present example, the communications interface 55 may communicate with external source over a network, which may be a public network shared with a large number of connected devices, such as a WiFi network or cellular network. In other examples, the communications interface 55 may receive data from an external source via a private network, such as an intranet or a wired connection with other sources. In further examples, the communications interface 55 may be an internal interface such as a USB interface, a SATA interface, a PCI or PCIe interface, a memory bus, or other interfaces to communicate with peripheral devices that may be part of the apparatus 50. In particular, the communications interface 55 is to receive raw data from the external source to be stored on the memory storage unit 60.

In the present example, the raw data includes a skeleton having a plurality of joints. The manner by which the skeleton received from the external source is generated is not particularly limited. For example, the skeleton may be derived from image data captured by a camera. In such an example, the image data may be processed using a pose estimation engine. In other examples, the skeleton may be received from an external source using data generated by an artist or processed data from an artistic work, such as a drawing or computer generated figure.

Furthermore, the communications interface 55 may be used to transmit results of the inference of joint rotations and positions in the skeleton. For example, the communications interface 55 may communicate with an animation engine (not shown) which may be part of the apparatus 50 or on a separate device. In some examples, the apparatus 50 may operate to receive skeletons from an external source to infer joint rotations and positions and to transmit data related to the inferred joint back to the external source. Accordingly, the apparatus 50 may operate as a service for computer animators.

The manner by which the communications interface 55 transmits and receives the data is not limited and may include receiving an electrical signal via a wired connection with external sources, such as an electronic device gathering data or a central server. In other examples, the communications interface 55 may connect to other devices wirelessly via the Internet. In further examples, the communications interface 55 may be a wireless interface to transmit and receive wireless signals such as via a WiFi network or directly in communication with an external device. As another example, the communications interface 55 may connect to another proximate device via a Bluetooth connection, radio signals or infrared signals and subsequently relayed to additional devices.

The memory storage unit 60 is to store data received via the communications interface 55. In particular, the memory storage unit 60 may store data representing skeletons, in particular three-dimensional skeletons representing human subjects for animation. The data is not particularly limited and skeleton may include additional information such as an identifier to identify a specific subject or the type of subject (e.g. human, animal, machine, etc). In the present example, the memory storage unit 60 may be store multiple skeletons representing different subjects for animation purposes. In particular, the skeletons may be different sizes and may include different joints having different rotations. For example, a skeleton may represent an image of a child for animation and another skeleton may represent an adult having different dimensions and different joint rotations due to differences in flexibility. In further examples, the skeletons may represent different types of subjects, such as an animal or machine.

The memory storage unit 60 may be also used to store addition data to be used by the apparatus 50. For example, the memory storage unit 60 may store various reference data sources, such as templates and model data. It is to be appreciated that the memory storage unit 60 may be a physical computer readable medium used to maintain multiple databases, or may include multiple mediums that may be distributed across one or more external servers, such as in a central server or a cloud server.

In the present example, the memory storage unit 60 is not particularly limited and may include a non-transitory machine-readable storage medium that may be any electronic, magnetic, optical, or other physical storage device. The memory storage unit 60 may be used to store information such as data received from external sources via the communications interface 55, template data, training data, normalized data from the pre-processing engine 65, or results from the inverse kinematics engine 70. In addition, the memory storage unit 60 may be used to store instructions for general operation of the apparatus 50. In particular, the memory storage unit 60 may store an operating system that is executable by a processor to provide general functionality to the apparatus 50 such as functionality to support various applications. The memory storage unit 60 may additionally store instructions to operate the pre-processing engine 65 and the inverse kinematics engine 70. Furthermore, the memory storage unit 60 may also store control instructions to operate other components and any peripheral devices that may be installed with the apparatus 50, such cameras and user interfaces.

The memory storage unit 60 may be preloaded with data, such as template skeletons, training data, or instructions to operate components of the apparatus 50. In other examples, the instructions may be loaded via the communications interface 55 or by directly transferring the instructions from a portable memory storage device connected to the apparatus 50, such as a memory flash drive. In other examples, the memory storage unit 60 may be an external unit such as an external hard drive, or a cloud service providing content.

The pre-processing engine 65 is to pre-process the data from the memory storage unit 60 to generate normalized data. The normalized data is subsequently stored in the memory storage unit 60 for subsequent use by the inverse kinematics engine 70. In the present example, the data retrieved from the memory storage unit 60 may be raw data representing a three-dimensional human skeleton with a plurality of joint positions. The data may be generated from an image with a pose estimation engine and include a dataset of coordinates for each joint position. For example, the dataset may include Cartesian coordinates based on a defined reference point or angular coordinates to define joint positions.

It is to be appreciated by a person of skill with the benefit of this description that each joint position of the raw data may represent or approximate a real human joint, such as a shoulder, elbow, wrist, neck, etc. Accordingly, the line between adjacent joint positions may represent a bone between two joints. The pre-processing engine 65 may be used to normalize the raw data by scaling the length or distance between joint positions to scale each length to a conform with a template skeleton. The manner by which the pre-processing engine normalizes the distances is not limited and may involve adjusting proportions of distances to conform for the template skeleton. As an example, if the distance between a shoulder and elbow of the template skeleton is approximately the same as the distance between the elbow and the wrist, the pre-processing engine 65 may modify the joint positions in the raw data to be substantially the same proportions.

As a specific example of the normalization process carried out on a human skeleton, a root joint is chosen and the distance to each neighboring joint is to be scaled to the length of the corresponding bone in a template. The selection of the root joint is not particularly limited and may be arbitrarily selected. In the some examples, the pelvis may be selected and in other examples, the neck may be selected. The direction of each bone is left unchanged but each dependent joint downstream or away from each scaled joint is moved accordingly to fit the new distance between joints representing a bone. This process continues down the skeleton towards the extremities until each joint is repositioned to have the distance between joints correspond to the template. It is to be understood that the joint discussed in this example is a skeleton joint which may represent several physiological joints in a human body, such as the neck joint. Furthermore, the bone referred to above represents the distance between skeleton joints and may represent more than one bone in a human body.

The template skeleton used by the pre-processing engine 65 is not particularly limited. For example, the template skeleton may be an average skeleton obtained from many human subjects. In the present example, the template skeleton is in a T-pose, however, another pose may be used in other examples. In other examples, the memory storage unit 60 may store multiple template skeletons with different sizes to account for variations in the raw data. For example, the raw data may include an identifier specifying a type of raw data, such as a human child, or an adult male. In such an example, the proportions may be different and the pre-processing engine 65 may select the most appropriate template skeleton for the subject. In examples without an identifier, the pre-processing engine may automatically select the appropriate template based on the raw data.

In some examples, the raw data may also include hidden joint positions generated by the pose estimation which may represent joint positions hidden behind the body of the subject from a certain perspective. For example, a side profile of a human subject may provide one visible joint position representing a shoulder while the other shoulder remains hidden by the body. In such examples, the raw data may include a binary flag for each joint position to indicate whether the joint position is visible or hidden. Accordingly, the hidden joint positions may also be normalized to conform with the template skeleton, which may or may not change the status of the joint position as it may be extended beyond the hidden position or into a hidden position after normalization.

Figure 2A:
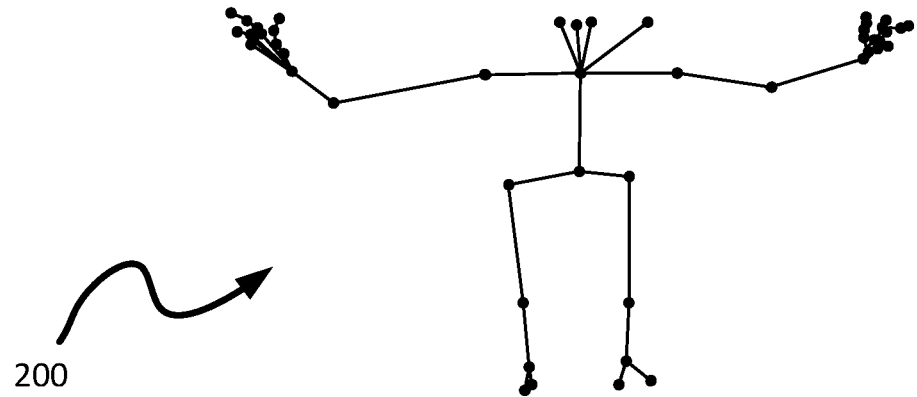
FIG. 2A is an example of an input skeleton received at the apparatus of FIG. 1.
Figure 2B:
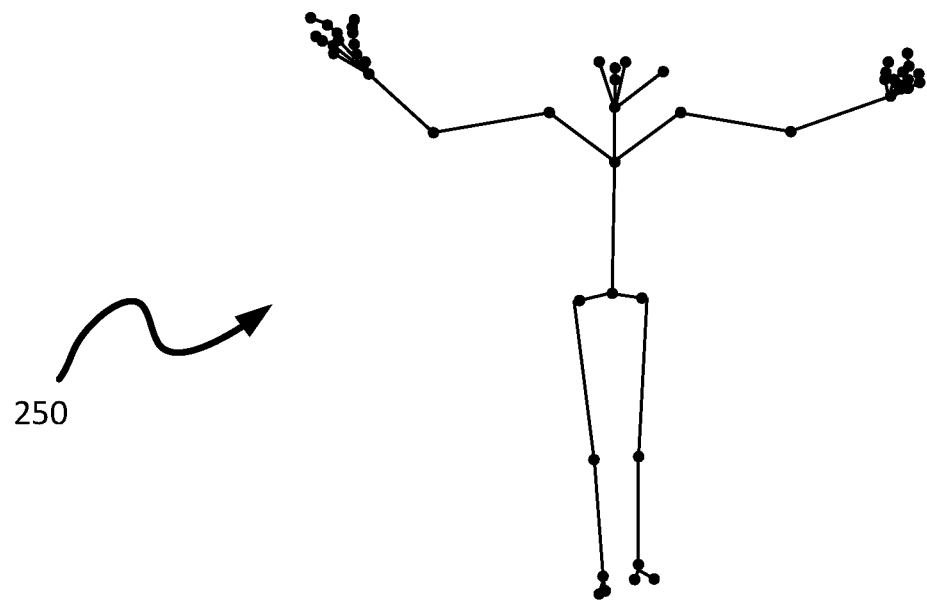
FIG. 2B is an example of a normalized skeleton.

Referring to FIGS. 2A and 2B, an example application of the pre-processing engine 65 is illustrate. FIG. 2A may represent a three-dimensional rendition of a human skeleton 600 from raw data received at the communications interface 55. As illustrated, the skeleton 600 appears to be distorted from general proportions of a human skeleton. The cause of the distortion is not particularly relevant and may result from approximations made in the pose estimation engine such as an imperfect joint position estimate or a joint detection failure. Other causes may be related to the image data used by the pose estimation engine. For example, the optics of the camera may provide a distorted image. In some examples, normalization may be carried out to provide uniform skeleton proportions may be handled in a similar manner by the inverse kinematics engine 70. After applying normalizing the skeleton 600, FIG. 2B illustrates a normalized skeleton 650 of the raw data. As shown, the skeleton 650 appears to have proportions more similar to a human subject.

The inverse kinematics engine 70 is to infer a joint rotation for a joint as well as any adjustments to the position in the normalized data generated by the pre-processing engine 65. The manner by which the inverse kinematics engine 70 infers the joint rotation and position is not particularly limited. In the present example, the inverse kinematics engine 70 applies a neural network to the normalized data generated by the pre-processing engine 65. In particular, the neural network used in the present example uses historical or temporal data stored in the memory storage unit 60. For example, the neural network may be a recurrent neural network. The recurrent neural network may use various architectures, such as a long short-term memory architecture or a gated recurrent unit architecture. As a specific example, the neural network may include four fully connected layers with 1024 units followed by two gated recurrent unit layers with 512 units, each with rectified linear unit activations and batch normalization. The final layer of the neural network may produce outputs consistent with the number of variables that represent the rotation for the joints in the skeleton. In the present example, each rotation output may represent a global rotation transform relative to the T-pose. In other examples, each rotation output may represent a global rotation transform relative to a parent joint based on a defined tree structure of the skeleton.

It is to be appreciated by a person of skill that any recurrent neural network deep enough to capture complex relationships between the natural movement of different joints and with sufficient units to represent a large space of possible pose sequences may be used. If more units are added per layer, the network is more computationally demanding and additional hardware may be required to maintain execution. Similarly, if the recurrent neural network includes more layers, it will use more time to compute and may be more challenging to train given a finite set of training data. However, the use of more recurrent units enables richer temporal features to be leveraged but may make it more difficult to find a convergent solution that produces a model with predictable results.

In other examples, models without recurrent layers may be used as well. However, the robustness of such models to noise may be diminish. For example, skeletons from past frames may be included into an inverse kinematics computation of a subsequent frame. As a specific example, a spatiotemporal analysis model with five fully connected layers, each processing per-frame data, and feeding into five subsequent fully connected layers that capture data from the previous frames may be used.

The neural network used by the inverse kinematics engine 70 may be trained using various types of training data. For example, the training data may include known joint rotations from a large animation dataset, such as from ADOBE MIXAMO, using a training framework such as TENSORFLOW. In other examples, tools like CAFFE or PYTORCH may also be used to train a model. Furthermore, animation data may be captured with an appropriate motion capture system such as XSENSE or VICON systems to train the model. In addition, source animation data from open academic sources such as the Carnegie Melon University (CMU) Graphics Lab Motion Capture Dataset may be used. In the present example, the training data further includes positional noise which may be added to the training data. For example, a Gaussian noise may be added to the training data prior to training the neural network. In other examples, noise distributions may be derived from statistics or historical data. In addition, physical models of noise may also be incorporated by modeling camera parameters and combining expected error distributions with known behavior of the method of inferring poses. Furthermore, noise may also be added in the form of dropout, which is to randomly occlude joints or hierarchical chains of joints to simulate failed detections and occlusions. It is to be appreciated by a person of skill in the art that by adding the noise to the training data, the neural network may be more robust at handling joint positions in the input data that may not be precise, such as data obtained from a pose estimation engine being applied to an image to derive a skeleton via markerless capture.

In the present example, results of the inverse kinematics engine 70 is shown below in table 1 for determining positional accuracy of the joint position and table 2 for determining the angular accuracy using different models to infer a joint rotation from a normalized skeleton. In the first column, a classical inverse kinematics solver is used where the joint rotation is inferred from performing a series of mathematical calculations. In the second column, a neural network, such as a convolutional neural network without any feedback or historical data is used to infer the joint position and rotation. In the third column, a recurrent neural network, such as the one described above is used to infer the joint position and rotation. The fourth column uses a spatiotemporal analysis involving a sliding time window to infer the joint position and rotation.

TABLE 1

Mean Positional Error (cm)

|  | Classical | NN | RNN | ST Analysis |
|---|---|---|---|---|
| Clean Test Data | 0.62 | 0.85 | 0.93 | 1.54 |
| Noisy Test Data | 6.80 | 4.01 | 2.73 | 2.67 |

TABLE 2

Mean Angle Error (degrees)

|  | Classical | NN | RNN | ST Analysis |
|---|---|---|---|---|
| Clean Test Data | 2.5 | 2.0 | 2.2 | 3.3 |
| Noisy Test Data | 14.5 | 7.9 | 4.3 | 4.9 |

As illustrated in table 1 and table 2, using a model with that considers historical data, such as the recurrent neural network or the spatiotemporal analysis provides the best performance when handling test data with noise.

Figure 3:
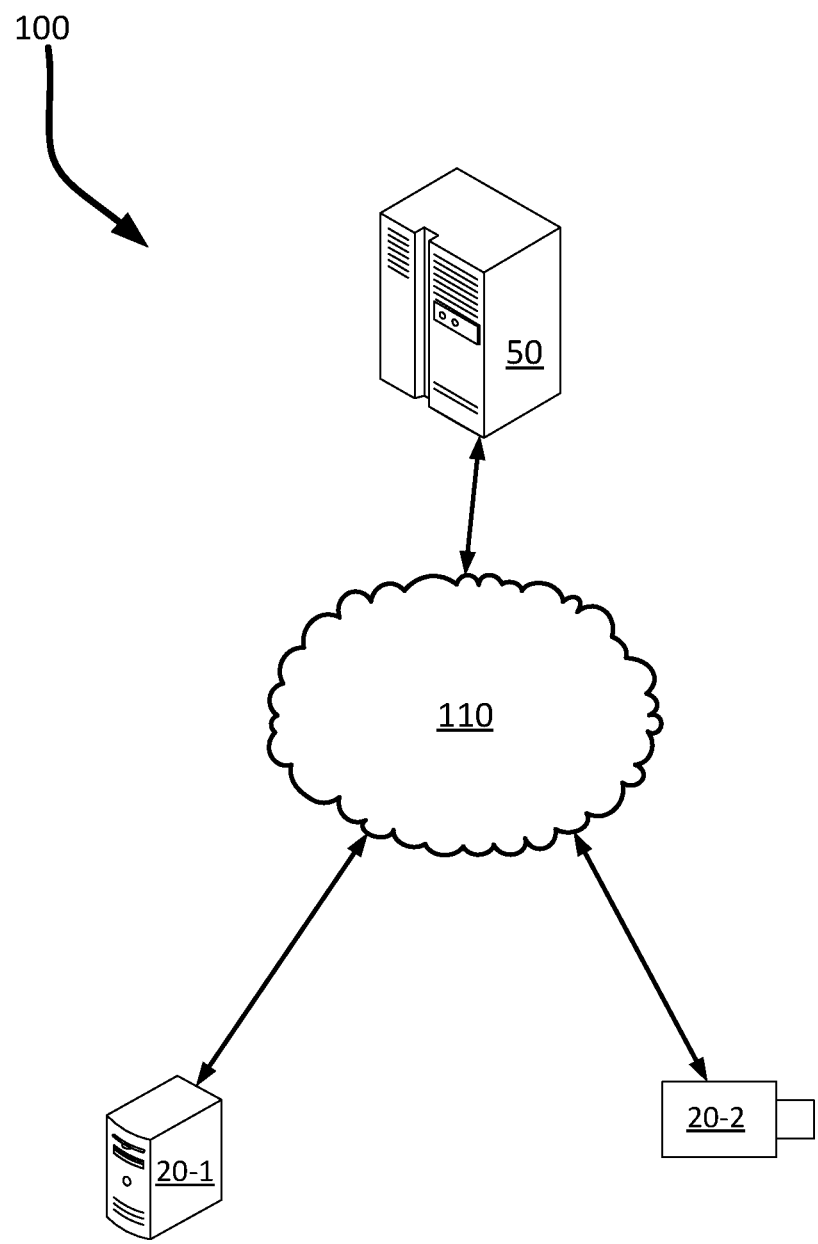
FIG. 3 is a representation of an example system to infer a joint rotation from an external source.

Referring to FIG. 3, a schematic representation of a computer network system is shown generally at 100. It is to be understood that the system 100 is purely exemplary and it will be apparent to those skilled in the art that a variety of computer network systems are contemplated. The system 100 includes the apparatus 50 to infer joint positions and rotations and a plurality of external sources 20-1 and 20-2 (generically, these external sources are referred to herein as "external source 20" and collectively they are referred to as "external sources 20", this nomenclature is used elsewhere in this description) connected by a network 110. The network 110 is not particularly limited and can include any type of network such as the Internet, an intranet or a local area network, a mobile network, or a combination of any of these types of networks. In some embodiments, the network 110 may also include a peer to peer network.

In the present embodiment, the external sources 20 may be any type of computing device used to communicate with the apparatus 50 over the network 110 for providing raw data from which a joint position and rotation is to be inferred. For example, the external source 20-1 may be a personal computer. It is to be appreciated by a person of skill with the benefit of this description that a personal computer may be substituted with a laptop computer, a portable electronic device, a gaming device, a mobile computing device, a portable computing device, a tablet computing device, a cell phone, a smart phone or the like. In some examples, the external source 20-2 may be a camera to capture an image and to generate raw data with a pose estimation engine. The raw data is not particularly limited and may be an input skeleton having a plurality of joint positions. The raw data may be generated from an image or video received or captured at the external source 20. In other examples, it is to be appreciated that the external source 20 may be a personal computer, on which content may be created such that the raw data is generated automatically from the content. In further examples, the skeleton may be directly created, such as from user input.

In the present embodiment, the apparatus 50 is to infer a joint position and rotation based on the raw data provided by the external source 20. In the present example, the external source 20 may be a content generator, such as an artist, or an image capturing device. The external source 20 provides a subject which is to be animated and may receive the inferred joint positions and rotations from the apparatus 50. In some examples, the apparatus 50 may be associated with a service provider that offers a the inferences as a service to the external sources 20 which may be third party devices. The inferences may then be used to generate animations with realistic movements. Accordingly, the apparatus 50 may be used as a tool by an animator that would otherwise spend significant time an effort to animate a skeleton such that its motion would appear natural.

Figure 4:
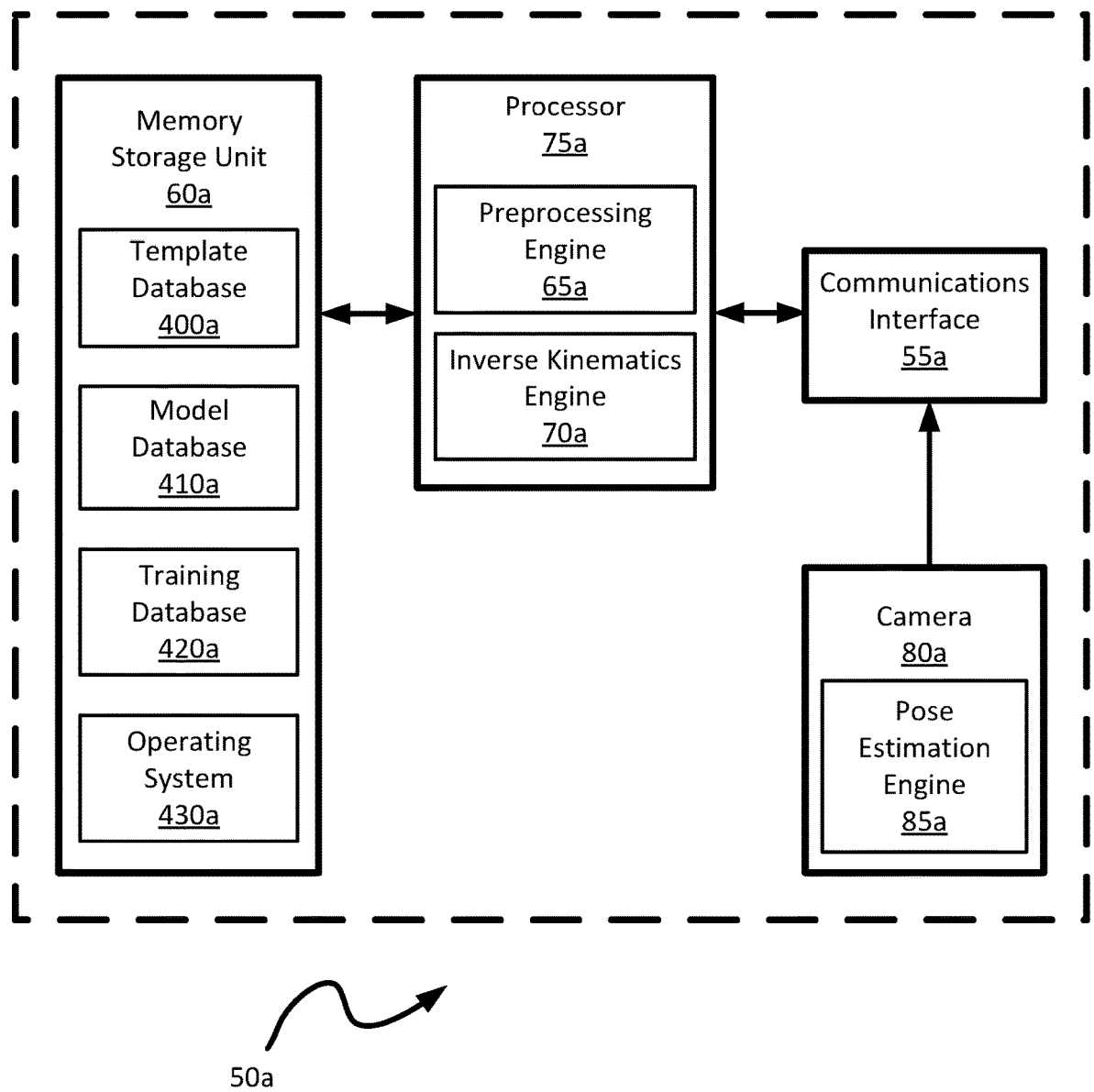
FIG. 4 is a schematic representation of the components of another example apparatus to infer a joint rotation.

Referring to FIG. 4, another schematic representation of an apparatus 50a to infer joint positions and rotations is generally shown. Like components of the apparatus 50a bear like reference to their counterparts in the apparatus 50, except followed by the suffix "a". In the present example, the apparatus 10a includes a communications interface 55a, a memory storage unit 60a, a processor 75a, and a camera system 80a. In the present example, the processor 75a includes a pre-processing engine 65a and an inverse kinematics engine 70a.

In the present example, the memory storage unit 60a may also maintain databases to store various data used by the apparatus 50a. For example, the memory storage unit 60a may include a template database 400a, a model database 410a, and a training database 420a. In addition, the memory storage unite may include an operating system 430a that is executable by the processor 75a to provide general functionality to the apparatus 50a. The memory storage unit 60a may additionally store instructions to carry out operations at the driver level as well as other hardware drivers to communicate with other components and peripheral devices of the apparatus 50a, such as various user interfaces to receive input or provide output.

In the present example, the template database 400a may store a template skeleton for use by the pre-processing engine 65a. In particular, the template database 400a may include a skeleton with joint positions of a skeleton in a canonical T-pose. In addition, the template database 400a may include skeletons in an A-pose, with arms down at a 45 degree angle. The template database 400a may include skeletons in a natural stance, standing talk with arms down by the side. It is to be appreciated that a single canonical template may also be used in some examples, or a template may be defined by the user of the system in other examples to improve results for a specific target human morphology. The template database 400a may also include skeleton templates that are learned from the input data over time, such that a template that fits closely to a user of the system but remains stable over time. In this case, the system may be trained to be robust to multiple human morphologies and/or accept a template skeleton as input to facilitate an inverse kinematics calculation that is fitted to the morphology of the skeleton being inferred.

The model database 410a is to store the historical data used by the neural network to carry out the joint position and rotation inferences by the inverse kinematics engine 70a. In particular, the model database 410a is to store units that may be generated at each layer to be fed into the next layer of a recurrent neural network. Accordingly, it is to be appreciated that during operation, the inverse kinematics engine 70a may be constantly be reading and writing to the model database 410a as new units generated are to be fed back into the neural network.

The training database 420*a* is to store training data for training the neural network used by the inverse kinematics engine 70*a*. In the present example illustrates that the training database 420*a* is stored locally on the apparatus 50*a*. Accordingly, the data in the training database 420*a* may be modified prior to being used to train the neural network. For example, the data in the training database 420*a* may be modified to add noise to the data, such as a Gaussian noise. In other examples, noise such as random occlusion, abd random augmentation of skeleton rotation, scale, and translation may be added. Although the present example stores the training data locally, other examples may store the training data externally, such as in a file server or cloud which may be accessed during the training of the neural network via the communications interface 55*a*.

The camera system 80*a* is to collect data in the form of images or videos. The camera system 80*a* is not particularly limited and the manner by which the camera system 80*a* collects data is not limited. For example, the camera system 80*a* may include various optical components to focus light onto an active pixel sensor having a complementary metal oxide semiconductor to detect light signals. In other examples, the optics may be used to focus light onto a charged coupled device.

In the present example, the camera system 80*a* further includes a pose estimation engine 85*a*. The pose estimation engine 85*a* is not particularly limited and may be used to generate a three-dimensional skeleton based on the image captured by the camera system 80*a*. Accordingly, the camera system 80*a* may provide image data and the raw data to the processor 75*a* for processing. The manner by which the pose estimation engine 85*a* generates the skeleton is not limited and may involve a markerless pose estimation process using image processing techniques. Alternatively, the pose estimation engine 85*a* may interact with peripheral devices or markers to generate the raw data. In some examples, it is to be appreciated that the pose estimation engine 85*a* may be separate from the camera system 80*a*, which may include general camera units. In such examples, the pose estimation engine 85*a* may be a separate stand-alone unit or part if the processor 75*a*. In further examples, the pose estimation engine 85*a* may be part of a separate system dedicated to image processing, such as a web service. It is to be appreciated by a person of skill with the benefit of this description that skeleton data produced by a pose estimation engine may have different formats, including different number of joints or body landmarks tracked, different ordering of the data, may or may not explicitly include visibility information, may be in different scales (e.g. pixel co-ordinates or unit normalized), be different bit depths (e.g. 8-bit, 16-bit), may provide joint positions in two-dimensional or three-dimensional co-ordinates, and may include other ancillary data (such as tracking IDs, bounding boxes, segmentation masks, etc.).

Figure 5:
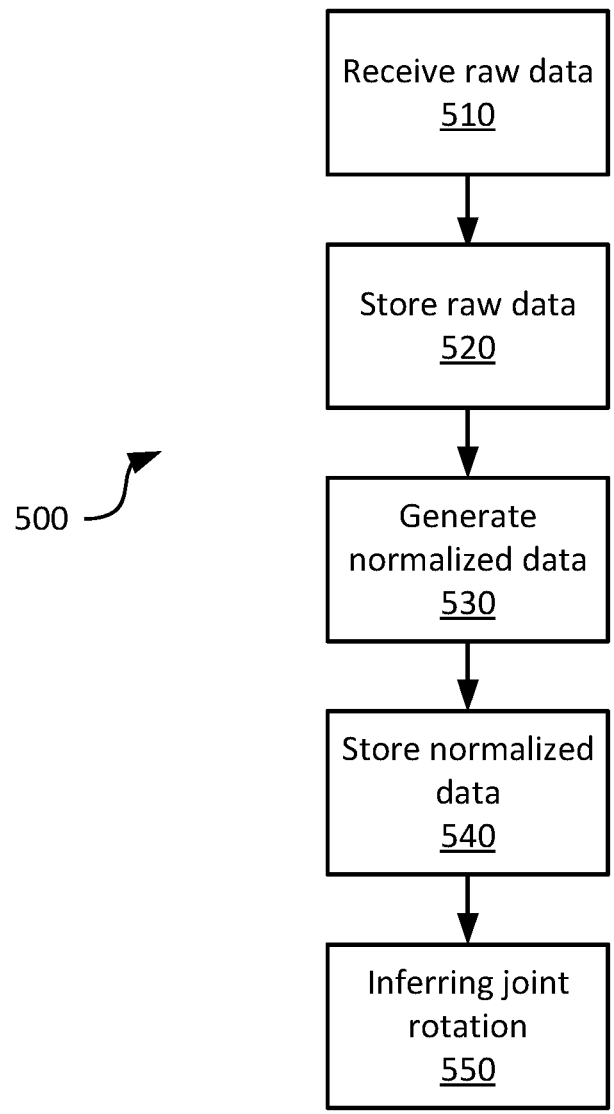
FIG. 5 is a flowchart of an example of a method of inferring a joint rotation.

Referring to FIG. 5, a flowchart of an example method of inferring joint positions and joint rotations is generally shown at 500. In order to assist in the explanation of method 500, it will be assumed that method 500 may be performed by the apparatus 50*a*. Indeed, the method 500 may be one way in which the apparatus 50*a* may be configured. Furthermore, the following discussion of method 500 may lead to a further understanding of the apparatus 50*a* and it components. In addition, it is to be emphasized, that method 500 may not be performed in the exact sequence as shown, and various blocks may be performed in parallel rather than in sequence, or in a different sequence altogether.

Beginning at block 510, the apparatus 50*a* receives raw data from an external source via the communications interface 55*a*. In the present example, the raw data may include a skeleton having a plurality of joints. For example, the skeleton received at the apparatus may represent a subject person, animal, machine or other object for animation. Once received at the apparatus 50*a*, the raw data is to be stored in the memory storage unit 60*a* at block 520.

Block 530 involves generating normalized data with the pre-processing engine 65*a*. In the present example, the normalized data may be generated from the raw data representing a three-dimensional human skeleton with a plurality of joint positions. For example, the dataset may include Cartesian coordinates based on a defined reference point or angular coordinates to define joint positions. Since the raw data may include distortions caused by noise or by the image processing of image data, the raw data may be normalized to provide a more realistic skeleton and/or a consistent scale of a subject such as a human based on a template skeleton. As a specific example, a markerless pose estimation of an image captured by a camera system may generate a skeleton where one arm is longer than the other arm. Since this is likely caused by an image processing defect, the pre-processing engine 65*a* may pre-process the raw data to generate normalized data where the arms are substantially similar in length. In other examples, the pre-processing engine 65*a* may normalize the length of specific segments between joints representing bones such that human proportions are obtained when the subject is a human. The normalized data is subsequently stored in the memory storage unit 60*a* at block 540 for subsequent use.

Next, block 550 comprises the inverse kinematics engine 70*a* applying a neural network to the normalized data to infer a joint rotation. In some examples, the inverse kinematics engine 70*a* may also be used to infer a joint position, such as to make an adjustment to the joint position in the normalized data. The specific neural network used by the inverse kinematics engine 70*a* is not particularly limited and may be a recurrent neural network which uses historical data to be fed into subsequent iterations or layers. Furthermore, the training of the neural network is not particularly limited an may involve using a training data set with added positional noise.

It should be recognized that features and aspects of the various examples provided above may be combined into further examples that also fall within the scope of the present disclosure.

What is claimed is:

1. A method comprising:
   receiving, via a communications interface, raw data that includes a first joint position and a second joint position of an input skeleton;
   storing the raw data in a memory storage unit;
   generating normalized data from the raw data by normalizing the first joint position and the second joint position to conform with a template skeleton;
   storing the normalized data in the memory storage unit;
   applying, to the normalized data, a neural network with an inverse kinematics engine to infer a joint rotation, wherein the neural network is to use historical data, and wherein training data used to train the neural network includes positional noise; and
   adjusting a visual representation of the input skeleton based on the joint rotation.

2. The method of claim 1, wherein generating the normalized data comprises normalizing a length between the first joint position and the second joint position of the input skeleton.

3. The method of claim 2, wherein normalizing the length comprises scaling the length between the first joint position and the second joint position based on the template skeleton.

4. The method of claim 1, wherein the template skeleton is posed in a T-pose.

5. The method of claim 1, further comprising generating the raw data from image data with a pose estimation engine.

6. The method of claim 5, further comprising capturing the image data with a camera system.

7. The method of claim 1, further comprising generating the training data.

8. The method of claim 7, wherein generating the training data comprises adding the positional noise to sample data.

9. The method of claim 1, further comprising storing the historical data in the memory storage unit.

10. A non-transitory computer readable medium encoded with codes, wherein the codes are to direct a processor to:
   receive raw data that includes a first joint position and a second joint position of an input skeleton;
   store the raw data in a memory storage unit;
   generate normalized data from the raw data by normalizing the first joint position and the second joint position to conform with a template skeleton;
   store the normalized data in the memory storage unit;
   apply, to the normalized data, a neural network with an inverse kinematics engine to infer a joint rotation, wherein the neural network is to use historical data, and wherein training data used to train the neural network includes positional noise; and
   adjust a visual representation of the input skeleton based on the joint rotation.

11. An apparatus comprising:
   a communications interface at which to receive raw data from an external source, wherein the raw data includes a first joint position and a second joint position of an input skeleton;
   a memory storage unit in which to store the raw data;
   a pre-processing engine that is configured to:
      generate normalized data from the raw data by normalizing the first joint position and the second joint position to conform with a template skeleton, and
      store the normalized data in the memory storage unit;
   an inverse kinematics engine that is configured to apply, to the normalized data, a neural network that uses historical data to infer a joint rotation, wherein training data used to train the neural network includes positional noise; and
   an animation engine that is configured to:
      receive the joint rotation inferred by the inverse kinematics engine, and
      adjust a visual representation of the input skeleton based on the joint rotation.

12. The apparatus of claim 11, wherein the pre-processing engine is to normalize a length between the first joint position and the second joint position of the input skeleton based on the template skeleton.

13. The apparatus of claim 11, wherein the template skeleton is posed in a T-pose.

14. The apparatus of claim 11, further comprising a pose estimation engine connected to the communications interface, wherein the pose estimation engine is configured to generate the raw data from image data.

\* \* \* \* \*